(12) United States Patent
Marlowe et al.

(10) Patent No.: US 12,321,487 B2
(45) Date of Patent: Jun. 3, 2025

(54) COMPUTER INTERFACES AND TECHNIQUES FOR PROTECTING SENSITIVE DATA

(71) Applicant: Acuitive Solutions, LLC., Charlotte, NC (US)

(72) Inventors: Phillip Marlowe, Ooltewah, TN (US); Karl Mumbower, Gainesville, GA (US)

(73) Assignee: Acuitive Solutions, Inc., Charlotte, NC (US)

( * ) Notice: Subject to any disclaimer, the term of this patent is extended or adjusted under 35 U.S.C. 154(b) by 54 days.

(21) Appl. No.: 18/082,225

(22) Filed: Dec. 15, 2022

(65) Prior Publication Data

US 2023/0237191 A1  Jul. 27, 2023

Related U.S. Application Data

(63) Continuation-in-part of application No. 17/584,055, filed on Jan. 25, 2022, now abandoned.

(51) Int. Cl.
*G06F 21/62* (2013.01)
*G06F 21/31* (2013.01)

(52) U.S. Cl.
CPC .......... *G06F 21/6245* (2013.01); *G06F 21/31* (2013.01)

(58) Field of Classification Search
CPC ............................. G06F 21/6245; G06F 21/31
See application file for complete search history.

(56) References Cited

U.S. PATENT DOCUMENTS

| | | | |
|---|---|---|---|
| 10,803,511 B2 * | 10/2020 | Peterson | G06Q 10/0835 |
| 11,100,579 B1 | 8/2021 | Raguse et al. | |
| 2006/0247982 A1 * | 11/2006 | Stolfo | G06Q 30/0613 705/26.41 |
| 2008/0133375 A1 * | 6/2008 | Torrenegra | G06Q 30/08 705/26.41 |
| 2008/0162304 A1 * | 7/2008 | Ourega | G06Q 30/0619 705/26.4 |

(Continued)

OTHER PUBLICATIONS

Meindl, "Feedback-Based Integration of the Whole Process of Data Anonymization in a Graphical Interface," Algorithms, 12, 191, Sep. 10, 2019.*

(Continued)

*Primary Examiner* — Nathan Erb
(74) *Attorney, Agent, or Firm* — Kilpatrick Townsend & Stockton LLP (57) ABSTRACT

One example described herein includes a system that can provide a first graphical user interface (GUI) to a first user, the first GUI allowing the first user to input a first set of parameters for a record. The system can also provide a second GUI to a second user, the second GUI allowing the second user to add a second set of parameters into the record. The second graphical user interface may not display at least one parameter of the first set of parameters provided by the first user. The system can then obtain derived information, which can be generated based on the first set of parameters, the second set of parameters, and sensitive data of the first user. The system can then provide an indication associated with the derived information to the second user via the second GUI, without providing the sensitive data to the second user.

20 Claims, 7 Drawing Sheets

(56) References Cited

U.S. PATENT DOCUMENTS

| | | |
|---|---|---|
| 2013/0254132 A1* | 9/2013 | Srinath .............. G06Q 10/0834 705/334 |
| 2013/0317929 A1 | 11/2013 | Schnorf et al. |
| 2014/0281506 A1 | 9/2014 | Redberg et al. |
| 2018/0349849 A1 | 12/2018 | Jones et al. |
| 2019/0228174 A1 | 7/2019 | Withrow et al. |
| 2020/0175472 A1 | 6/2020 | Kaiser et al. |
| 2020/0311670 A1* | 10/2020 | Sankaran ......... G06Q 10/08355 |
| 2021/0124638 A1 | 4/2021 | Van Heuklon et al. |
| 2021/0319437 A1 | 10/2021 | Johnson et al. |

OTHER PUBLICATIONS

U.S. Appl. No. 17/584,055, "Final Office Action", Aug. 18, 2022, 26 pages.
U.S. Appl. No. 17/584,055, "Non-Final Office Action", May 10, 2022, 39 pages.

* cited by examiner

COMPUTER INTERFACES AND TECHNIQUES FOR PROTECTING SENSITIVE DATA

CROSS-REFERENCE TO RELATED APPLICATION

This application is a continuation-in-part of U.S. patent application Ser. No. 17/584,055, filed Jan. 25, 2022, which is hereby incorporated by reference herein.

TECHNICAL FIELD

The present disclosure generally relates to data security on a computer system. More specifically, but not by way of limitation, this disclosure relates to computer interfaces and techniques for protecting sensitive data.

BACKGROUND

Entities may interact with one another to perform various tasks. For example, a first entity may interact with a second entity to facilitate the transport of a physical object, such as a server, camera, piece of clothing, robot, and turbine. The first entity may request the physical object from the second entity and provide some transport details via telephone to the second entity. The second entity may then provide the packaged object to a carrier (e.g., a mail carrier) for transport. In some cases, the first entity may need to disclose sensitive data to the second entity while participating in the physical task. For example, the first entity may need to disclose sensitive data like account data or discount codes to the second entity. This disclosure of sensitive data can be undesirable because it can raise security problems.

BRIEF DESCRIPTION OF DRAWINGS

A full and enabling disclosure is set forth more particularly in the remainder of the specification. The specification makes reference to the following drawings.

DETAILED DESCRIPTION

Data security is of ever increasing concern. Oversharing and inadequate protection of sensitive data can result in abuse and other malicious activity, which is an ever-growing problem. But the conventional ways in which some operations are performed in certain industries requires the sharing of sensitive data. This is particularly prevalent in the transportation context, whereby a second entity of a physical object may need to obtain the sensitive data of a first entity for various reasons. Since that sensitive data is private and typically unique to the first entity, it would be preferable if the second entity did not have to share that data.

Some examples of the present disclosure can overcome one or more of the abovementioned problems by providing computer interfaces and techniques for protecting sensitive data. The computer interfaces and protocols can include a secure web-based platform. The web-based platform can be designed to protect the sensitive data of the first entity, while still allowing a second entity to make use of information that is derived from the sensitive data. For example, the second entity can use a specialized access code to access a record that was started by the first entity on the web-based platform. Upon accessing the record, the second entity can add information to the record via the web-based platform and receive outputs from the web-based platform. The outputs can be different from, but generated based at least in part on, the sensitive data. This allows information derived from the sensitive data to be provided to the second entity, without having to expose the sensitive data itself to either the second entity or another human that could jeopardize the security. Instead, the generation of the outputs is performed automatically by the web-based platform without human intervention, which helps maintain the secrecy of the sensitive data.

As one specific example, a system can generate a web-based platform through which a first entity can generate a digital record, such as a transportation record for transporting an object from a starting location to a destination location. The starting location can be associated with a second entity and the destination location can be associated with the first entity. Through the web-based platform, the first entity can then send an invitation to the second entity to view and modify the record. In particular, the system can generate an access code for accessing the record and transmit an electronic invitation (e.g., an e-mail or text message) with the access code to the second entity. The access code may be a single-use access code that can only be used one time and then subsequently becomes invalid. Alternatively, the access code may be a limited-duration access code that can only be used during a designated time window. Either way, the second entity can use the access code to login to the web-based platform and modify the record.

Continuing with the above example, the system may next determine a transport route for the object based on the details of the updated record. To do so, the system can interact with one or more application programming interfaces (APIs) of one or more computing systems associated with one or more carriers. Such computing systems can be referred to as carrier computing systems. In particular, the system can provide the some or all of the details of the transportation record, along with sensitive data associated with the first entity, to the carrier computing systems via one or more API requests. The sensitive data can include information that is specific to the first entity's account with one or more carriers and/or other services. In some examples, the sensitive data may be usable to obtain an advantage, such as a preferred rate. The carrier computing systems can receive the API requests and generate API responses based on the transport details and the sensitive data. Such responses may include fees and schedule data. The carrier computing system can then provide the API responses back to the system. Based on the data contained in the API responses from the carrier computing systems, the system can select a transport route. The system may also rely on one or more preconfigured rules, which may be selected by the first entity and hidden from the second entity, to select the transport route. The transport route may be associated with a selected carrier, and optionally a selected service of that carrier, that can transport the object from the starting location to the destination location.

Having determined the transport route, the system can obtain label data from the selected carrier associated with the transport route. This may involve transmitting an API request to the carrier computing system of the selected carrier associated with the transport route. The system can then provide the label data to the second entity through the web-based platform. The second entity can receive the label data, print it out to create a physical label, attach the physical label to the object (e.g., a box containing the object), and provide the object to the one or more carriers for transport to the first entity. Through this process, the sensitive data can be maintained on the web-based platform and used to determine other information, without it being exposed to the second entity. This can improve the security of the sensitive data.

In some examples, the system can generate the access code using one or more algorithms. The access code can include numbers, letters, special characters, or a combination thereof. Such access codes are different from the login credentials for the first entity and the second entity to the web-based platform (e.g., if the second entity also has an account with the web-based platform). Rather, the access codes are specific to an individual record for the purpose of allowing secure and limited access to the record via the web-based platform.

These illustrative examples are given to explain the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
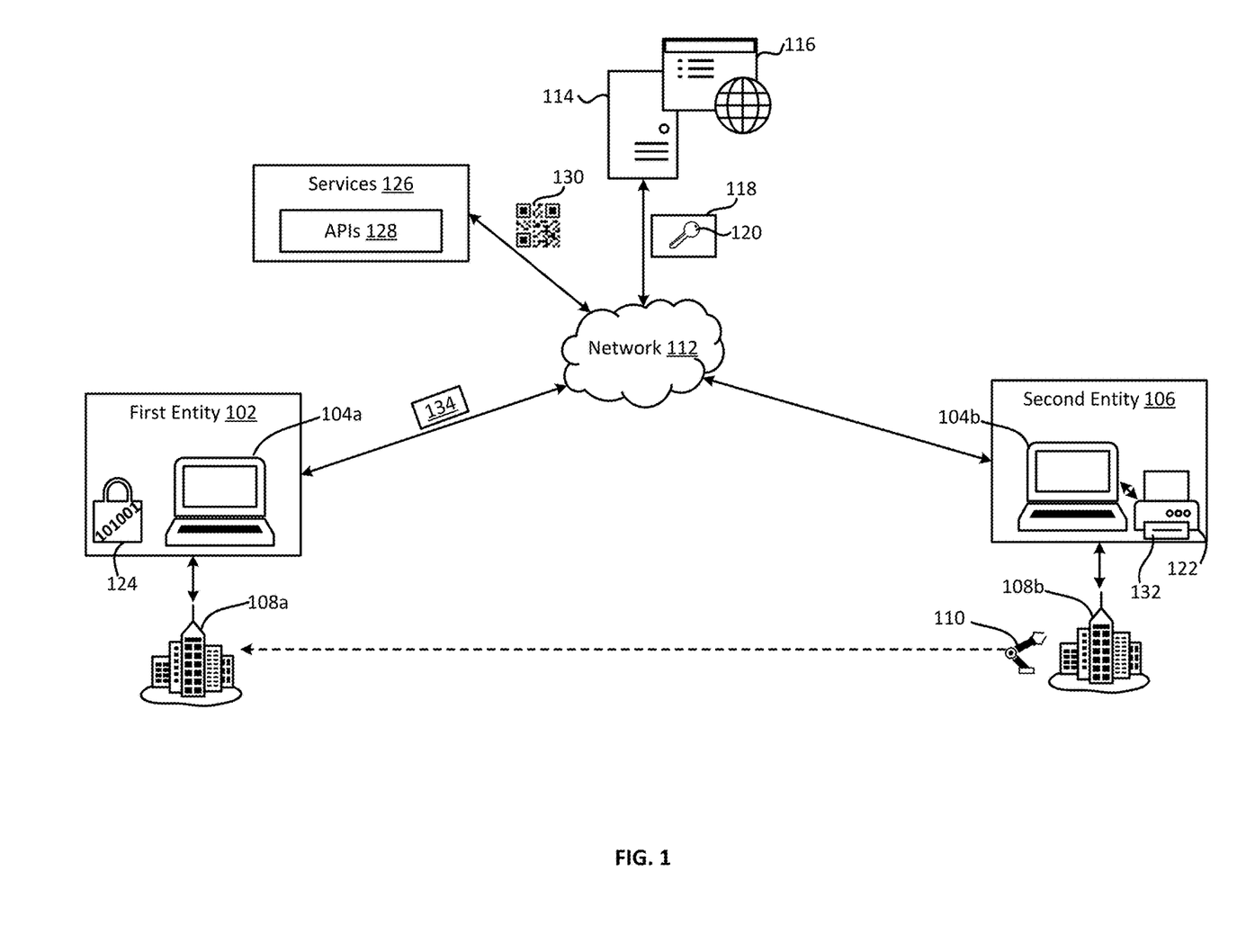
FIG. 1 is a block diagram of an example of a system for implementing some aspects of the present disclosure.

FIG. 1 is a block diagram of an example of a system 100 according to some aspects of the present disclosure. The system 100 includes one or more servers 114 configured to generate a web-based platform 116 that is accessible over one or more networks 112, such as the Internet, to one or more client devices. The web-based platform 116 may be accessed via web browser, a mobile application, or other means. The web-based platform 116 can be configured to secure sensitive data 124 of a first entity 102, while allowing a second entity 106 to obtain information determined based on the sensitive data 124 for use in one or more processes. For example, the web-based platform 116 can provide graphical user interfaces and protocols that allow the a first entity 102 and a second entity 106 to construct a shared record and initiate a transportation process, while protecting sensitive data 124 of the first entity 102.

In some examples, the first entity 102 can be any requestor that requests an object from a second entity, and the second entity 106 can be any requestee that receives a request for an object. Examples of the second entity can include a producer or distributor of the object. The first entity 102 and the second entity 106 may be located in different geographic locations. For example, the first entity 102 may be associated with a first location 108a, such as Albany, New York. The second entity 106 may be associated with a second location 108b, such as Los Angeles, California.

The first entity 102 can operate a client device 104a to access the web-based platform 116. Examples of a client device can include a laptop computer, smart phone, tablet, e-reader, smart watch, etc. To access the web-based platform 116, the first entity 102 may need to input authentication information, such as a username and password. Upon logging into the web-based platform 116, the first entity 102 can create a new record, such as a transportation record for transporting an object 110 from a starting location, such as location 108b, to a destination location, such as location 108a. In FIG. 1, the object 110 is a robotic arm. But other types of physical objects may also be used in other examples.

The process of generating the record may involve the first entity 102 inputting any number and combination of parameters, such as transportation parameters associated with transporting the object 110, into the web-based platform 116. Examples of the transportation parameters can include an object identifier that uniquely identifies the requested object 110, a second entity identifier that uniquely identifies the second entity, a contact address (e.g., an e-mail address or telephone number) associated with the second entity, a starting location from which the object 110 will be transported, a destination location for the object 110, a carrier for use in transporting the object 110, one or more carrier rules that act as constraints on how the object 110 is to be transported, and a requested delivery date for the object 110. In other examples, the record may be different from a transportation record and the parameters may be different from transportation parameters. The first entity 102 can input the parameters via a first web interface of the web-based platform 116 to create the record.

Figure 2A:
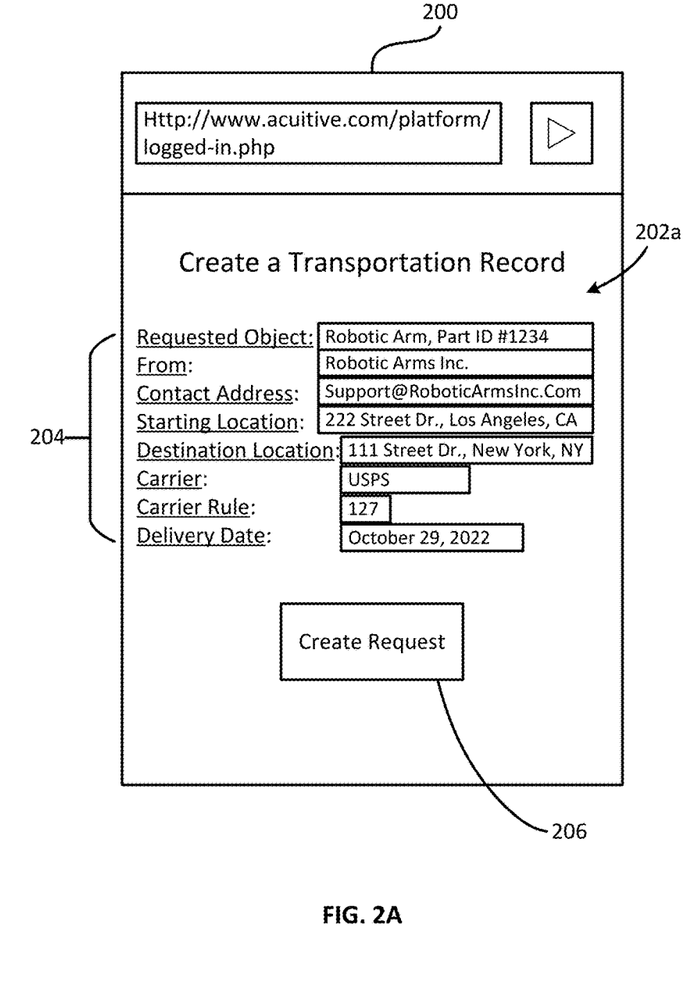
FIGS. 2A-B show an example of a first web interface according to some aspects of the present disclosure.
Figure 2B:
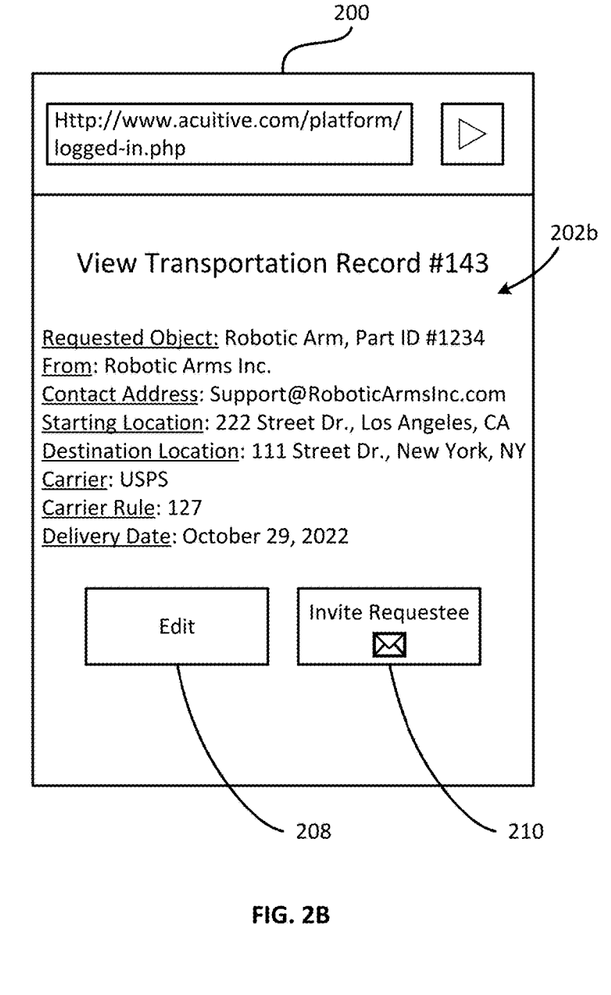

One example of the first web interface is shown in FIGS. 2A-B. As shown in FIG. 2A, the first web interface may be accessed via a website browser 200 (or a mobile application) and include a first interface page 202a through which a first entity 102 can create a record, which in this example is a transportation record. The first interface page 202a can include interface elements, such as text boxes, radio buttons, check boxes, pull-down lists, etc., for allowing the first entity 102 to input the transportation parameters 204. Once the first entity 102 has completed the form, the first entity 102 can select a button 206 to create the record. The first interface page 202a can then transition to a second interface page 202b, as shown in FIG. 2B. The second interface page 202b may provide a summary of the record along with a first option 208 to edit/revise the record and a second option 210 to send an invitation to the second entity 106 to access the record. If the first entity 102 selects the second option 210, the web-based platform 116 can initiate a process for generating and transmitting an access code to the second entity 106.

Referring back to FIG. 1, the web-based platform 116 can generate the access code 120 using one or more algorithms, such as hash functions and/or random code generators. The access code 120 can include numbers, letters, special characters, or a combination thereof. The access code 120 can be unique to the transportation record and be configured for enabling the second entity 106 to access the transportation record. The access code 120 may be a single-use access code, a limited-duration access code, or another type of access code.

Having generated the access code 120, the web-based platform 116 can transmit a message 118 that includes the access code 120 to the second entity 106. The message 118 may be an e-mail message, a short messaging service (SMS) message, a multimedia messaging service (MMS) message, etc. The message 118 may be transmitted to the second entity 106 (e.g., a client device 104b of the second entity 106) via the network 112. The contact address to which the message 118 is transmitted may be one of the transportation parameters input by the first entity 102.

The second entity 106 can receive the message 118 and use the access code 120 therein to access the record on the web-based platform 116. In particular, the second entity 106 can operate its client device 104b to access the web-based platform 116, which can prompt the second entity 106 to input the access code 120. Upon entering a valid access code 120, the web-based platform 116 can present the second entity 106 with a second web interface. The second web interface may include details of the record, such as one or more of the parameters therein. The second web interface may also conceal some of the parameters input by the first entity 102, such as a preconfigured rule (e.g., the carrier rule) selected by the first entity 102.

In some examples, the second web interface can enable the second entity 106 to input additional parameters. In the transportation context, the additional parameters can include object parameters describing the object 110 to be transported. Examples of such object parameters can include a weight of the object 110, one or more dimensions or sizes of the object 110, and a date at which the object 110 will be available. By inputting the object parameters, the second entity 106 can modify (e.g., update) the transportation record and thereby influence at least one aspect of the transport process.

Figure 3A:
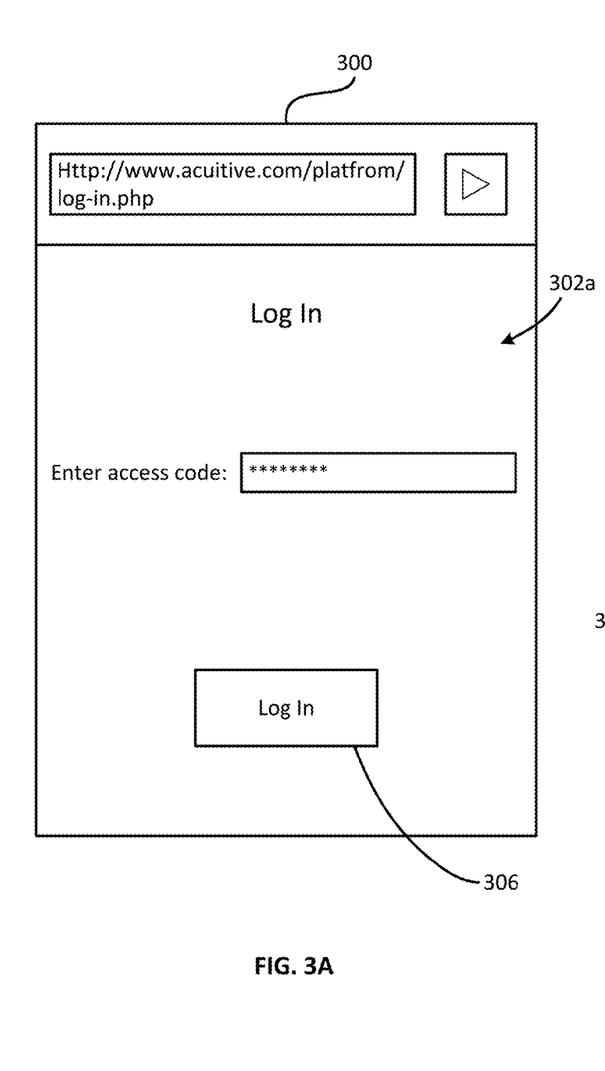
FIG. 3A-D show an example of a second web interface according to some aspects of the present disclosure.
Figure 3B:
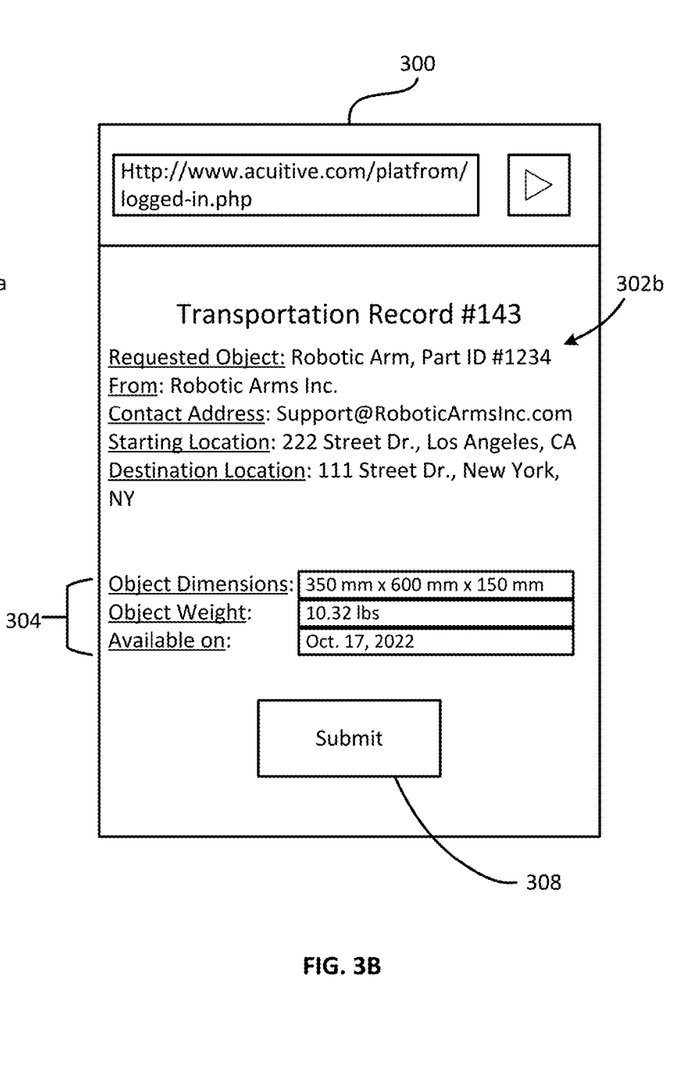
Figure 3C:
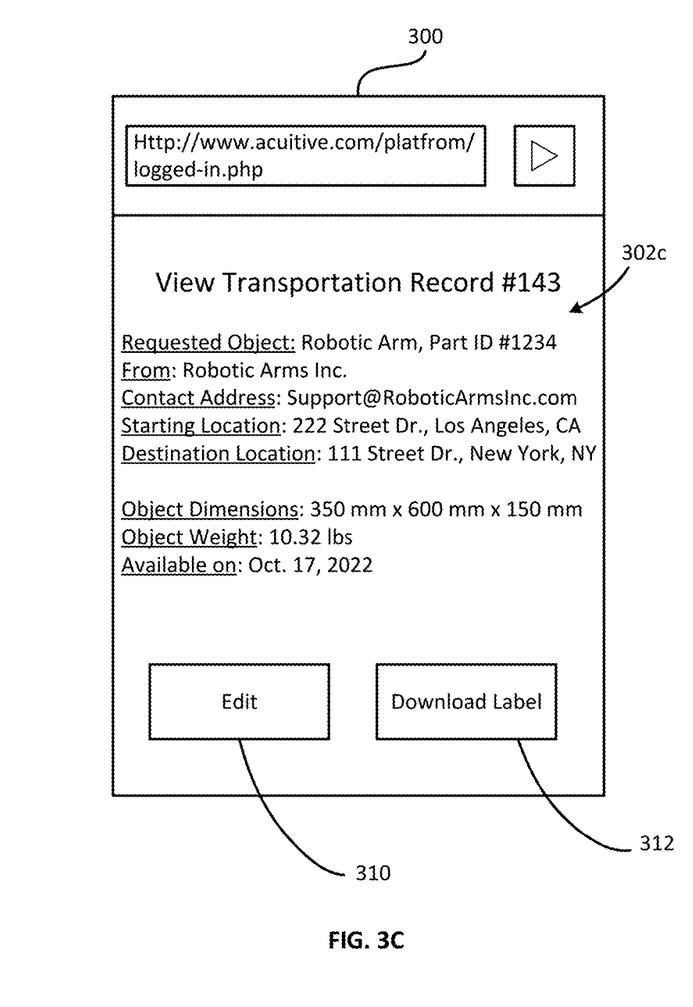

One example of the second web interface usable by the second entity 106 is shown in FIGS. 3A-D. As shown in FIG. 3A, the second web interface may be accessed via a website browser 300 (or a mobile application) and include a first interface page 302a that prompts the second entity 106 to input the access code 120. Upon entering the access code 120, the second entity 106 can press a button 306a to access the record, which in this example is a transportation record. Other examples may involve other types of records. Based on the button press, the first interface page 302a can transition to a second interface page 302b, as shown in FIG. 3B. The second interface page 302b may display details associated with the transportation record. Such details may include some or all of the transportation parameters input by the first entity 102. The second interface page 302b can also include interface elements, such as any of the types of interface elements described above, for allowing the second entity 106 to input object parameters 304. Since the first entity 102 does not yet have the object 110, the first entity 102 may not know the object parameters. Thus, the second entity 106 can collaborate in the process to fill in that knowledge gap. Once the second entity 106 has completed the form, the second entity 106 can press a button 308 to submit the object parameters. The second interface page 302b can then transition to a third interface page 302c, as shown in FIG. 3C. The third interface page 302c may provide a summary of the record along with a first option 310 to edit/revise the record and a second option 312 to download label data associated with the request. In FIG. 3C, the carrier and carrier rule is excluded from the summary, since that is an optional parameter that may be considered sensitive and therefore it may be desirable to conceal the that parameter from the second entity 106. But in other examples, the carrier and/or carrier rule may be included in the summary.

Referring back to FIG. 1, once the record is complete (e.g., the transportation parameters and/or the object parameters have been provided), the web-based platform 116 may obtain (e.g., determine or generate) information based on sensitive data 124 provided by the first entity 102. For example, the web-based platform 116 can determine a transport route for the object 110. The transport route may correspond to a specific carrier, and optionally a specific service of that specific carrier, for transporting the object along a specific path from the starting location to the destination location. In some examples, the web-based platform 116 can determine the transport route based on the transportation parameters, the object parameters, the sensitive data 124 of the first entity 102, and/or one or more preconfigured rules selected by the first entity 102. The sensitive data 124 can include information that is specific to the first entity's account with one or more services 126 (e.g., carriers). Examples of the sensitive data 124 can include an account name, account number, address, password, special code, and/or contact information. The sensitive data 124 may be usable use in obtaining a preferred rate or another advantage in relation to the services 126.

In some examples, the web-based platform 116 can determine information based on the sensitive data 124 by transmitting API requests 134 to one or more APIs 128 of one or more services 126. For example, the web-based platform 116 can determine the transport route by transmitting commands to one or more APIs 128 of one or more services 126. The API requests 134 can include, or may be generated based on, the transportation parameters, the object parameters, the sensitive data 124 of the first entity 102, and/or one or more preconfigured rules. Based on the data in the API requests 134, the services 126 can provide API responses. The API responses may include rate data, delivery data, and/or other data. From the API responses, the web-based platform 116 can determine a group of candidate transport routes. The candidate transport routes may correspond to different carriers and/or different services by the same carrier. The web-based platform 116 can then select a transport route from among the group of candidate transport routes based on the selected transport route satisfying one or more predefined criteria. Examples of the predefined criteria can include the transport route having the lowest rate among all of the candidate transport routes; the transport route meeting a target delivery date, which may be specified as a transportation parameter; and/or the transport route involving a particular carrier (e.g., FedEx, USPS, UPS, etc.), which may also be specified as a transportation parameter.

In some examples, the web-based platform 116 can then select a transport route from among the group of candidate transport routes by executing a machine-learning model, such as a neural network, support vector machine, k-means classifier, or an ensemble of models. The neural network may be a deep neural network with multiple hidden layers. The machine-learning model can be pre-trained based on training data. The training process may transform the machine-learning model from an untrained state into a trained state by tuning weights associated with the model. Any suitable training process may be used. For example, a supervised training process may be used. As another example, an unsupervised or a semi-supervised training process may be used.

Having determined the transport route, in some examples the web-based platform 116 may then obtain label data 130 corresponding to the transport route. To do so, the web-based platform 116 can further interact with an API 128 of a service 126 associated with the selected transport route. For example, the web-based platform 116 can transmit an API request to the API 128 of the service 126 associated with the selected transport route. The API request can include transport route information about the selected transport route. Based on the transport route information, the service 126 can respond by generating and providing the label data 130 back to the web-based platform 116. In this way, the label data 130 may be indirectly generated based on the sensitive data 124 of the first entity 102, without exposing the sensitive data 124 itself to the second entity 106. The label data 130 may include barcodes, QR codes, or other types of codes along with other data, such as one or more of the transportation parameters and one or more of the object parameters.

Once the label data 130 has been obtained, the web-based platform 116 can transmit the label data 130 to the second entity 106. The second entity 106 can receive the label data 130, print the label data 130 using a printer 122, attach the printed label 132 to the object 110, and deposit the object 110 with a carrier for transport. Since the label data 130 is different from the sensitive data 124, the second entity 106 may obtain advantages associated with the sensitive data 124 without having any direct knowledge of it.

Figure 3D:
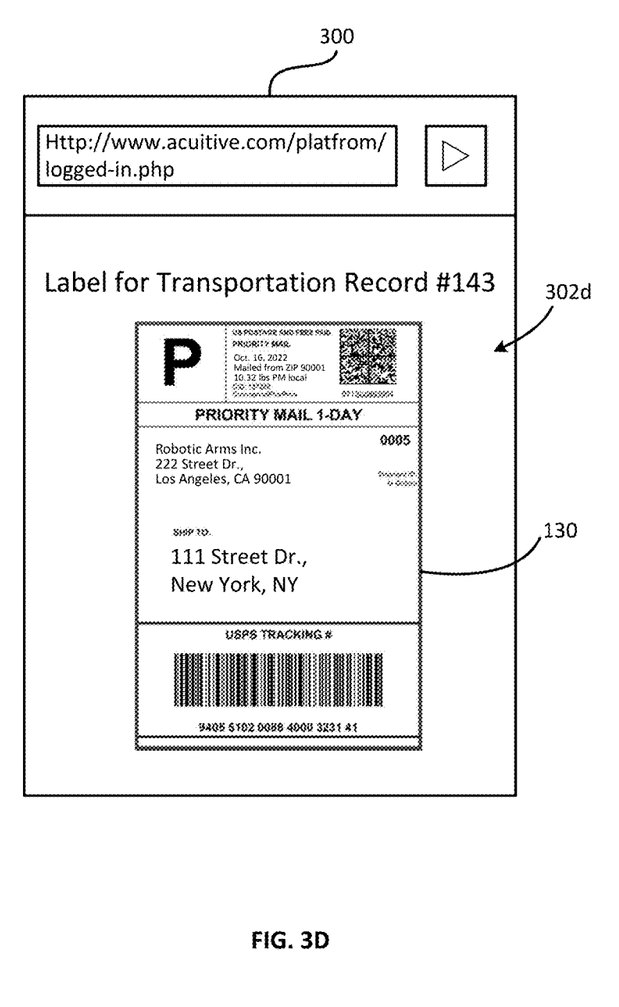

One example of the label data 130 is shown in FIG. 3D. In this example, the label data 130 is presented in a fourth interface page 302*d*. But in other examples, the label data 130 may be provided to the second entity 106 in other ways (e.g., as a downloadable image file or portable document format (PDF) file). The label data 130 can include one or more label codes that may be generated based on the sensitive data 124 of the first entity 102, as described above. In some examples, the label data 130 can be output in response to the second entity 106 selecting the second option 312 shown in FIG. 3C.

Using the above techniques, the web-based platform 116 can allow the first entity 102 and the second entity 106 to interact in meaningful ways, without exposing the sensitive data 124 of the first entity 102. For example, the web-based platform 116 can allow sensitive data 124 of the second entity 106 to be used in generating label data 130 for use by the second entity 106, without exposing that sensitive data to the second entity 106.

Although FIGS. 1-3 show certain numbers and combinations of elements, those are intended to be illustrative and non-limiting. Other examples may include more elements, fewer elements, different elements, or a different configuration of the elements than is shown in those drawings. For example, the first web interface described above may include more graphical objects, fewer graphical objects, different graphical objects, or a different configuration of the graphical objects than is shown in FIGS. 2A-B. Similarly, the second web interface described above may include more graphical objects, fewer graphical objects, different graphical objects, or a different configuration of the graphical objects than is shown in FIGS. 3A-D. Further, the order in which the interface pages are shown in FIGS. 2-3 is intended to be illustrative and non-limiting. Other examples may include more interface pages, fewer interface pages, different interface pages, or a different order of the interfaces pages than is shown in those drawings.

Figure 4:
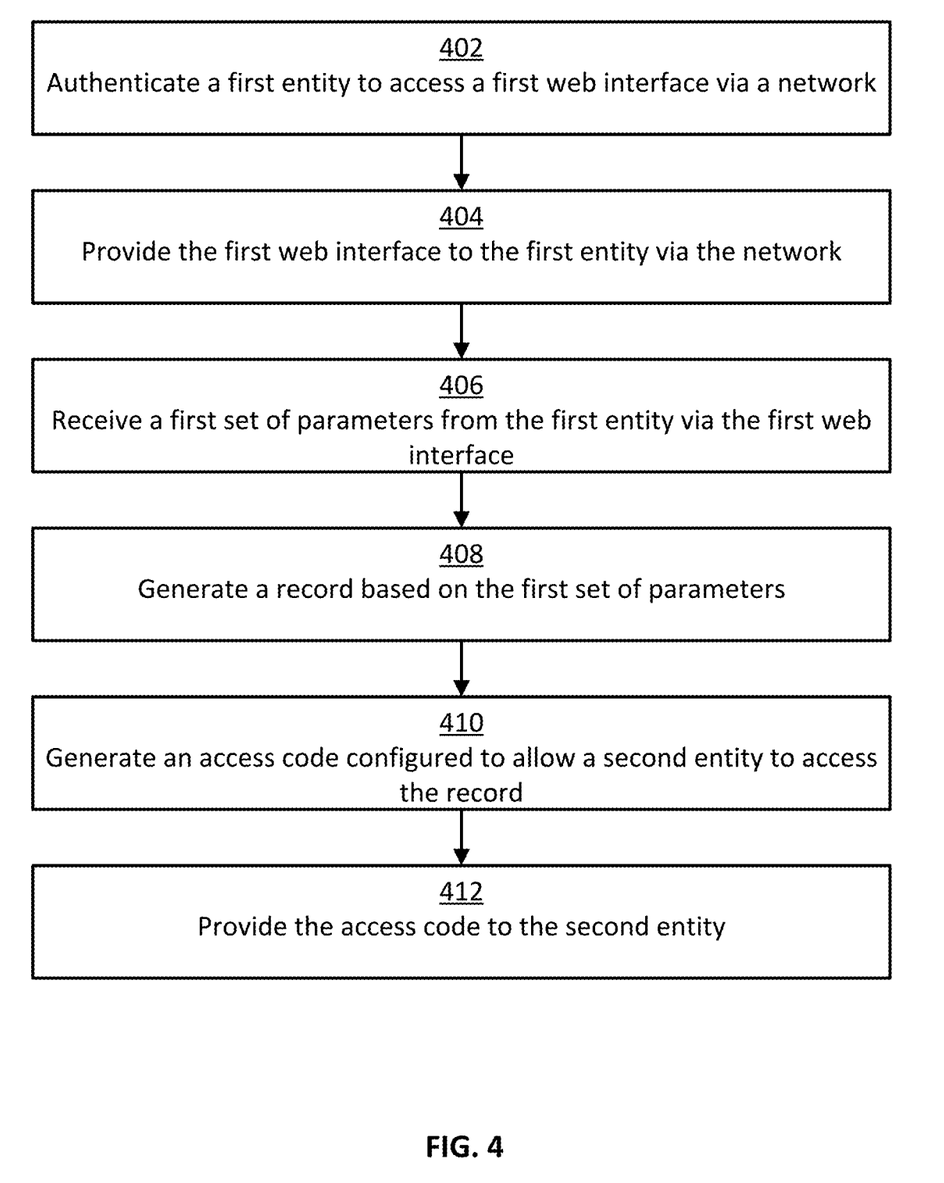
FIG. 4 is a flow chart of an example of a process for generating a digital record and an access code according to some aspects of the present disclosure.

Referring now to FIG. 4, shown is a flow chart of an example of a process for generating a record and an access code according to some aspects of the present disclosure. Other examples may involve more operations, fewer operations, different operations, or a different order of the operations than are shown in FIG. 4. The operations of FIG. 4 are described below with reference to the components of FIGS. 1-3 described above.

In block 402, a server 114 hosting a web-based platform 116 authenticates a first entity (e.g., the first entity 102) to access a first web interface via network 112. Examples of the first web interface are shown in FIGS. 2A-B. The server 114 can authenticate the first entity in response to receiving authentication information from the first entity.

In block 404, the server 114 provides the first web interface to the first entity via the network 112.

In block 406, the server 114 receives a first set of parameters (e.g., transportation parameters) from the first entity via the first web interface. As used herein, a "set of parameters" can include one or more parameters. The first set of parameters may correspond to the transport of an object from a starting location to a destination location. Examples of the object may include robotic components; autonomous cars; clothes; wind or water turbines; electronic components such as integrated circuit components, capacitors, resistors; etc.

In block 408, the server 114 generates a record (e.g., a transportation record) based on the first set of parameters. For example, the server 114 can generate a new database record based on the first set of parameters, where the new database record corresponds to the record.

In block 410, the server 114 generates an access code 120 configured to allow a second entity (e.g., the second entity 106) to access the record. The access code 120 may be randomly generated (e.g., pseudo-randomly generated) or generated in another manner, for example by using one or more predefined algorithms.

In block 412, the server 114 provides the access code 120 to the second entity. This may involve transmitting the access code 120 in a message 118 to the second entity via the one or more networks 112.

Figure 5:
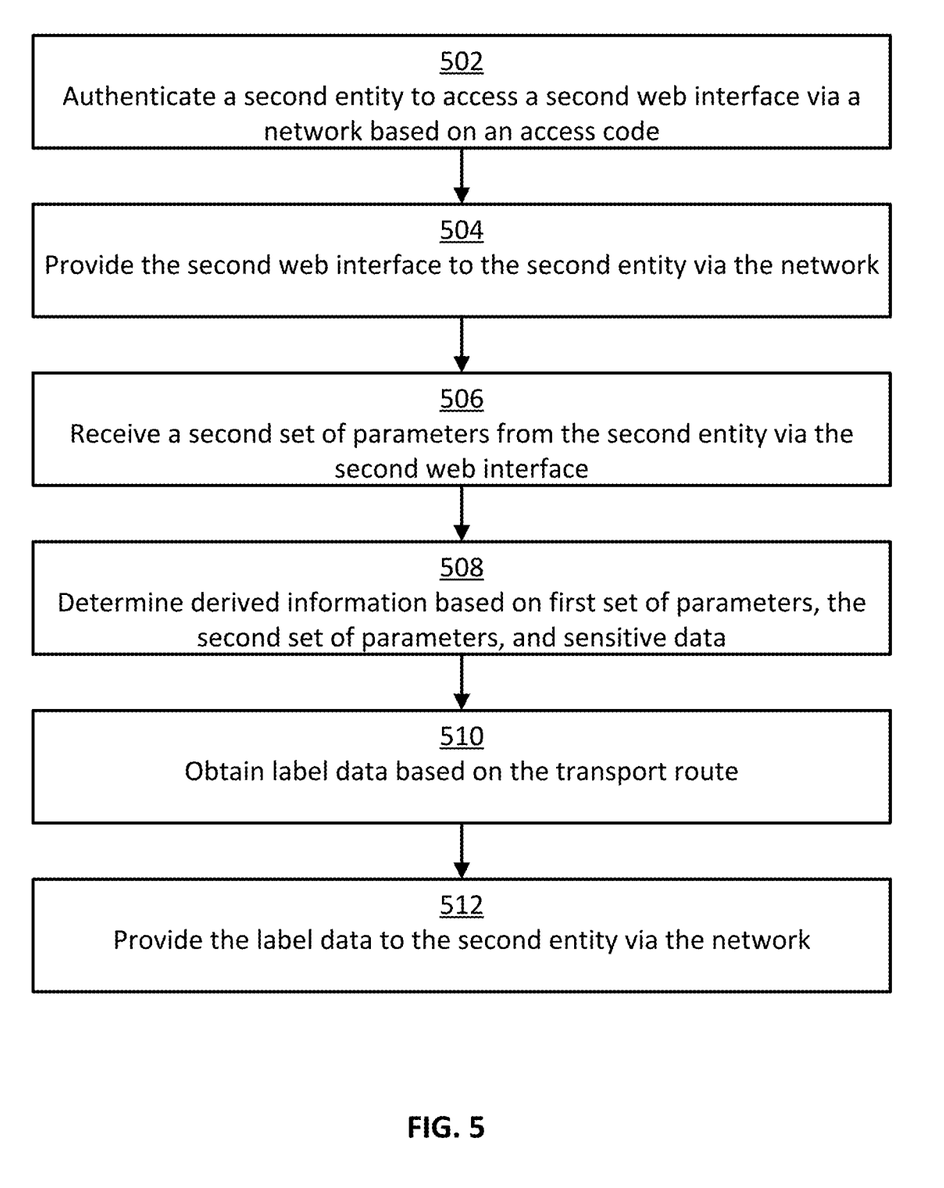
FIG. 5 is a flow chart of an example of a process for determining a transport route and generating label data according to some aspects of the present disclosure.

FIG. 5 shows a flow chart of an example of a process for generating label data according to some aspects of the present disclosure. Other examples may involve more operations, fewer operations, different operations, or a different order of the operations than are shown in FIG. 5. The operations of FIG. 5 are described below with reference to the components of FIGS. 1-3 described above.

In block 502, a server 114 hosting a web-based platform 116 authenticates a second entity (e.g., the second entity 106) to access a second web interface via network 112. The second entity can be different from the first entity described above. Examples of the second web interface are shown in FIGS. 3A-D. The server 114 can authenticate the second entity in response to receiving the access code 120 from the second entity.

In block 504, the server 114 provides the second web interface to the second entity via the network 112.

In block 506, the server 114 receives a second set of parameters (e.g., object parameters) from the second entity via the second web interface.

In block 508, the server 114 determines derived information based on the first set of parameters, the second set of parameters, and sensitive data 124. The sensitive data 124 may be associated with the first entity 102 or the second entity 106. The derived information can be any information determined based on the first set of parameters, the second set of parameters, and sensitive data 124. For example, the server 114 can transmit the first set of parameters, the second set of parameters, and the sensitive data 124 to one or more services 126. The one or more services 126 can generate one or more responses based on the first set of parameters, the second set of parameters, and the sensitive data 124. In some examples, the responses can correspond to one or more transport routes. In some such examples, the server 114 can then select a transport route from among the one or more transport routes, for example based on the selected transport route satisfying one or more predefined criteria. The predefined criteria may be selected by the first entity 102 and/or preconfigured by an administrator.

In block 510, the server 114 obtains label data 130 based on the derived information. For example, the server 114 can transmit a request for the label data 130 to a service 126 that generated the derived information. In some examples in which the derived information includes transport routes, different services 126 may be associated with different transport routes. The service 126 can receive the request and responsively return the label data 130 to the server 114.

In block 512, the server 114 provides the label data 130 to the second entity. This may involve transmitting the label data 130 to the second entity via the one or more networks 112. After receiving the label data 130, the second entity may print out the label data 130 using a printer 122 and affix the printed label 132 to the object 110. The label data 130 may indicate the transport route, in some examples. The server 114 may additionally or alternatively provides other indicators of the transport route to the second entity. For example, the server 114 may update the second web interface to specify the transport route (e.g., to include a text description of the transport route or a graphic of the transport route, such as on a map). This may allow the second entity to create its own label data, which may be generated independently of the sensitive data 124.

Figure 6:
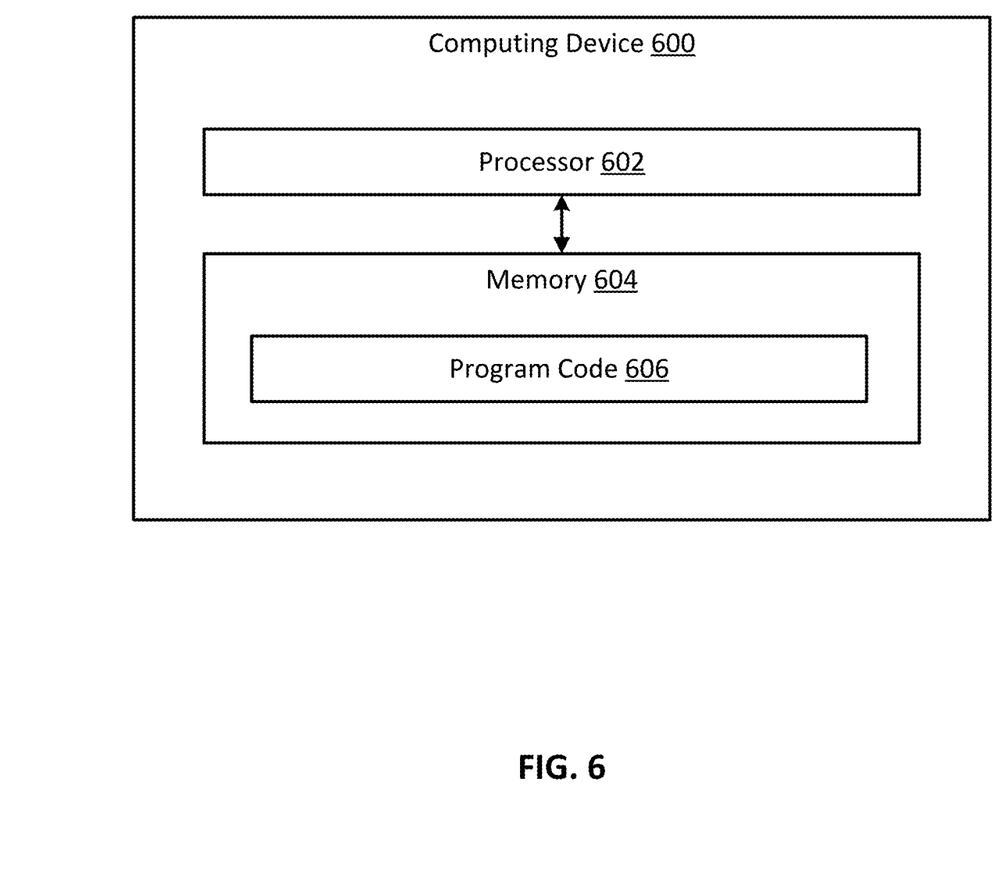
FIG. 6 is a block diagram of an example of a computing device usable to implement some aspects of the present disclosure.

FIG. 6 is a block diagram of an example of a computing device 600 usable to implement some aspects of the present disclosure. The computing device 600 can be, for example, one of the servers 114 or either of the client devices 104a-b of FIG. 1.

The computing device 600 includes a processor 602 coupled to a memory 604 via a bus. The processor 602 can include one processing device or multiple processing devices. Non-limiting examples of the processor 602 include a Field-Programmable Gate Array (FPGA), an application-specific integrated circuit (ASIC), a microprocessor, etc. The processor 602 can execute program code 606 stored in the memory 604 to perform operations, such as any of the operations described herein. In some examples, the program code 606 can include processor-specific instructions generated by a compiler or an interpreter from code written in any suitable computer-programming language, such as C, C++, C#, etc.

The memory 604 can include one memory device or multiple memory devices. The memory 604 can be non-volatile and may include any type of memory device that maintains stored data when powered off. Examples of the memory 604 include electrically erasable and programmable read-only memory (EEPROM), flash memory, or any other type of non-volatile memory. At least some of the memory can include a non-transitory computer-readable medium from which the processor 602 can read program code 606. A computer-readable medium can include electronic, optical, magnetic, or other storage devices capable of providing the processor 602 with computer-readable instructions or other program code. Examples of computer-readable mediums include magnetic disks, memory chips, ROM, random-access memory (RAM), an ASIC, a configured processor, optical storage, or any other medium from which a computer processor can read the program code 606.

The computing device 600 may also include other components. For example, the computing device 600 may include input devices such as a keyboards, microphone, touchscreen, touch pad, and mouse. The computing device 600 may also include output devices, such as displays, haptic devices, and speakers. The computing device 600 may further include network interfaces, busses, and other hardware, which have been excluded from FIG. 6 for simplicity.

The above description of certain examples, including illustrated examples, has been presented only for the purpose of illustration and description and is not intended to be exhaustive or to limit the disclosure to the precise forms disclosed. Numerous modifications, adaptations, and uses thereof will be apparent without departing from the scope of the disclosure. For instance, any examples described herein can be combined with any other examples to yield further examples.

The invention claimed is:

1. A server system comprising:
one or more hardware processors; and
a memory including instructions that are executable by the one or more hardware processors for causing the one or more hardware processors to execute operations including:
providing a first graphical user interface to a first user, the first graphical user interface including a first set of graphical input elements configured to allow the first user to input a first set of parameters for a record, and the first user being separate from the server system;
receiving the first set of parameters from the first user through the first graphical user interface;
generating the record based on the first set of parameters and storing the record in memory;
generating an access code using a predefined algorithm, the access code being configured to allow a second user to access the record, the second user being separate from the first user and the server system;
providing the access code to the second user via a message that includes the access code;
authorizing the second user to access the record in response to receiving the access code from the second user; and
subsequent to authorizing the second user to access the record:
providing a second graphical user interface to the second user, the second graphical user interface including a second set of graphical input elements configured to allow the second user to integrate a second set of parameters into the record, wherein the second set of graphical input elements includes at least one graphical input element that is different from the first set of graphical input elements, and wherein the second graphical user interface does not display at least one parameter of the first set of parameters provided by the first user;
receiving the second set of parameters from the second user through the second graphical user interface;
obtaining derived information that is generated based on the first set of parameters and the second set of parameters, wherein obtaining the derived information involves providing sensitive data of the first user to one or more remote computing systems, the server system being usable to conceal the sensitive data from the second user; and
providing an indication associated with the derived information to the second user via the second graphical user interface, without providing the sensitive data to the second user.

2. The server system of claim 1, wherein the indication includes label data, and wherein the operations further comprise:
obtaining the label data based on the derived information; and providing the label data to the second user for causing the label data to be printed with a printer and coupled to an object.

3. The server system of claim 1, wherein the operations further comprise:
   detecting an interaction with a graphical input element of the first graphical user interface by the first user; and
   generating the access code in response to detecting the interaction.

4. The server system of claim 1, wherein the operations further comprise:
   determining a group of candidate transport routes by communicating the first set of parameters, the second set of parameters, and the sensitive data of the first user to the one or more remote computing systems.

5. The server system of claim 4, wherein the operations further comprise:
   selecting a transport route from among the group of candidate transport routes, wherein the indication includes the transport route.

6. The server system of claim 5, wherein the operations further comprise executing a trained neural network to select the transport route from among the group of candidate transport routes.

7. The server system of claim 1, wherein the second graphical user interface is configured to output one or more parameters of the first set of parameters.

8. The server system of claim 1, wherein the access code is a single-use access code or a limited-duration access code.

9. A method comprising:
   providing, by one or more processors of a server system, a first graphical user interface to a first user, the first graphical user interface including a first set of graphical input elements configured to allow the first user to input a first set of parameters for a record, and the first user being separate from the server system;
   receiving, by the one or more processors of the server system, the first set of parameters from the first user through the first graphical user interface;
   generating, by the one or more processors of the server system, the record based on the first set of parameters and storing the record in memory;
   generating, by the one or more processors of the server system, an access code using a predefined algorithm, the access code being configured to allow a second user to access the record, the second user being separate from the first user and the server system;
   providing, by the one or more processors of the server system, the access code to the second user via a message that includes the access code;
   authorizing, by the one or more processors of the server system, the second user to access the record in response to receiving the access code from the second user; and
   subsequent to authorizing the second user to access the record:
      providing, by the one or more processors of the server system, a second graphical user interface to the second user, the second graphical user interface including a second set of graphical input elements configured to allow the second user to integrate a second set of parameters into the record, wherein the second set of graphical input elements includes at least one graphical input element that is different from the first set of graphical input elements, and wherein the second graphical user interface does not display at least one parameter of the first set of parameters provided by the first user;
      receiving, by the one or more processors of the server system, the second set of parameters from the second user through the second graphical user interface;
      obtaining, by the one or more processors of the server system, derived information that is generated based on the first set of parameters and the second set of parameters, wherein obtaining the derived information involves providing sensitive data of the first user to one or more remote computing systems, the server system being usable to conceal the sensitive data from the second user; and
      providing, by the one or more processors of the server system, an indication associated with the derived information to the second user via the second graphical user interface, without providing the sensitive data to the second user.

10. The method of claim 9, wherein the indication includes label data, and further comprising:
    obtaining the label data based on the derived information; and
    providing the label data to the second user for causing the label data to be printed with a printer and coupled to an object.

11. The method of claim 9, further comprising:
    detecting an interaction with a graphical input element of the first graphical user interface by the first user; and
    generating the access code in response to detecting the interaction.

12. The method of claim 9, further comprising:
    determining a group of candidate transport routes by communicating the first set of parameters, the second set of parameters, and the sensitive data of the first user to the one or more remote computing systems; and
    selecting a transport route from among the group of candidate transport routes, wherein the indication includes the transport route.

13. The method of claim 12, further comprising executing a trained neural network to select the transport route from among the group of candidate transport routes.

14. The method of claim 9, wherein the second graphical user interface is configured to output one or more parameters of the first set of parameters.

15. The method of claim 9, wherein the access code is a single-use access code or a limited-duration access code.

16. A non-transitory computer-readable medium comprising storing program code thereon that is executable by one or more hardware processors of a server system for causing the one or more hardware processors to execute operations including:
    providing a first graphical user interface to a first user, the first graphical user interface including a first set of graphical input elements configured to allow the first user to input a first set of parameters for a record, and the first user being separate from the server system;
    receiving the first set of parameters from the first user through the first graphical user interface;
    generating the record based on the first set of parameters and storing the record in memory;
    generating an access code configured to allow a second user to access the record, the second user being separate from the first user and the server system;
    providing the access code to the second user;
    authorizing the second user to access the record in response to receiving the access code from the second user; and
    subsequent to authorizing the second user to access the record:

providing a second graphical user interface to the second user, the second graphical user interface including a second set of graphical input elements configured to allow the second user to integrate a second set of parameters into the record, wherein the second set of graphical input elements includes at least one graphical input element that is different from the first set of graphical input elements, and wherein the second graphical user interface does not display at least one parameter of the first set of parameters provided by the first user;

receiving the second set of parameters from the second user through the second graphical user interface;

obtaining derived information that is generated based on the first set of parameters and the second set of parameters, wherein obtaining the derived information involves providing sensitive data of the first user to one or more remote computing systems, the server system being usable to conceal the sensitive data from the second user;

determining a group of candidate transport routes by communicating the first set of parameters, the second set of parameters, and the sensitive data of the first user to the one or more remote computing systems;

selecting a transport route from among the group of candidate transport routes; and providing an indication associated with the derived information to the second user via the second graphical user interface, without providing the sensitive data to the second user, wherein the indication includes the transport route.

17. The non-transitory computer-readable medium of claim 16, wherein the operations further comprise:
executing a trained neural network to select the transport route from among the group of candidate transport routes.

18. The non-transitory computer-readable medium of claim 16, wherein the operations further comprise:
generating the access code using a predefined algorithm; and
providing the access code to the second user via a message that includes the access code.

19. The non-transitory computer-readable medium of claim 16, wherein the access code is a single-use access code or a limited-duration access code.

20. The non-transitory computer-readable medium of claim 16, wherein the second graphical user interface is configured to output one or more parameters of the first set of parameters.

* * * * *